No. 648,231. Patented Apr. 24, 1900.
D. BRABANT.
SHIFTING THILL FOR VEHICLES.
(Application filed Sept. 1, 1899.)
(No Model.) 2 Sheets—Sheet 2.
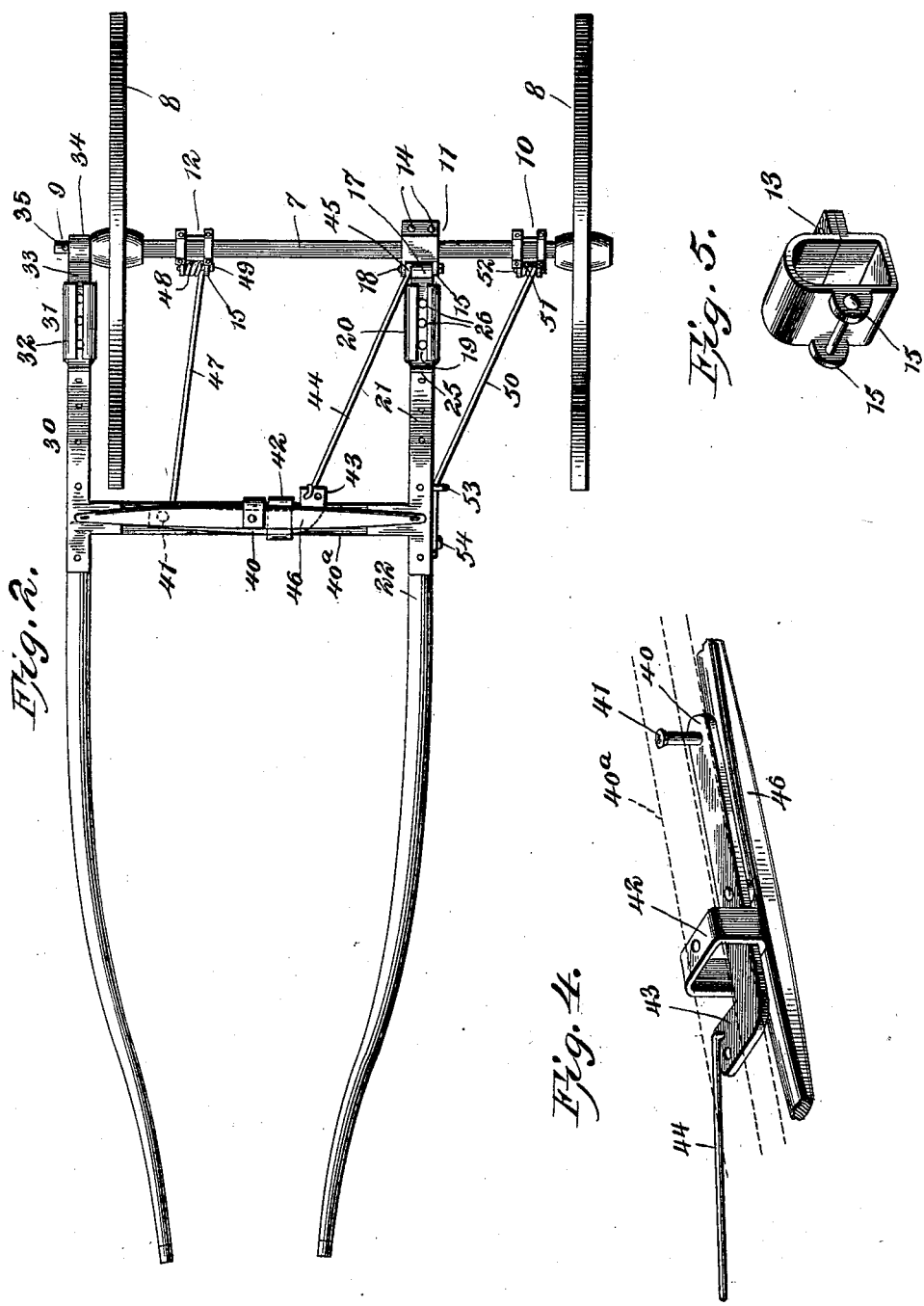

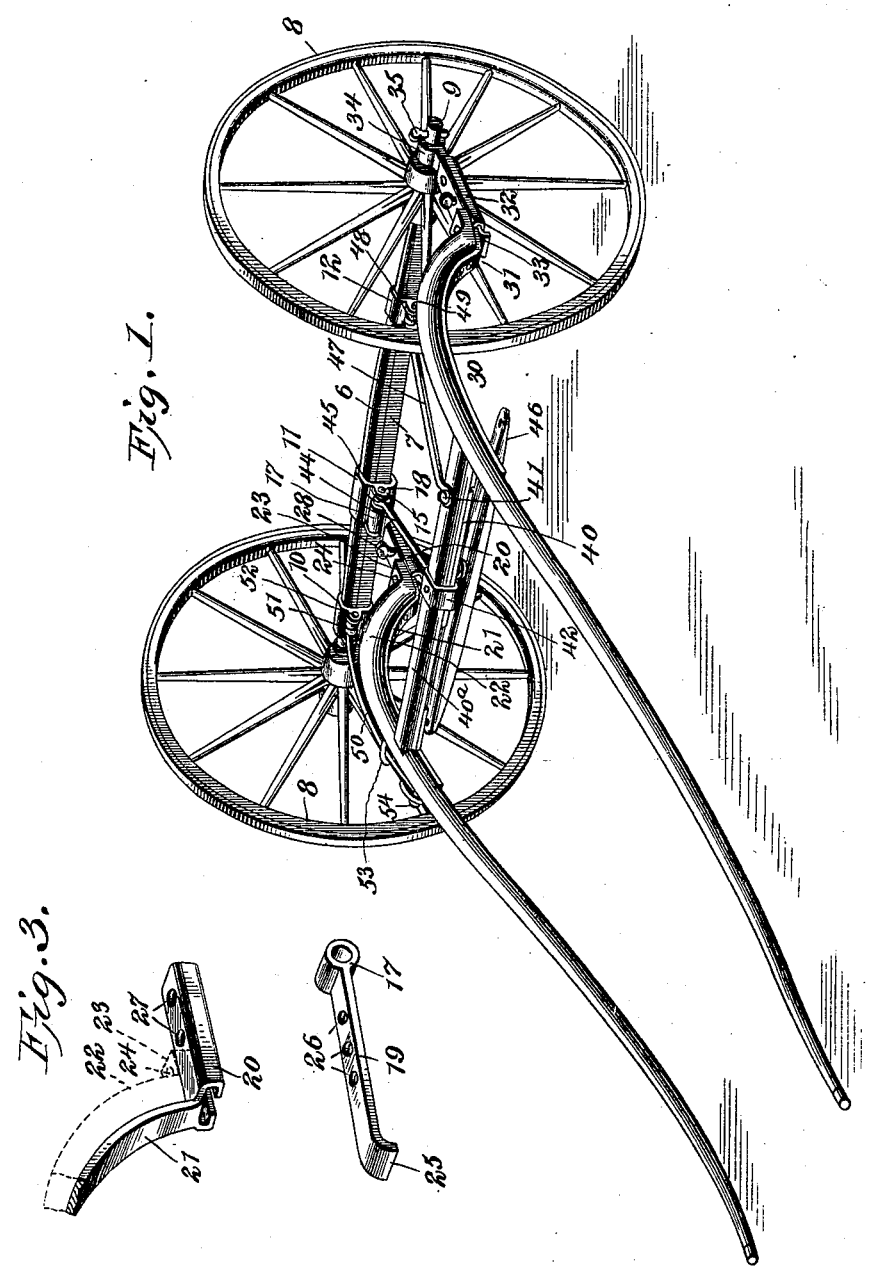

UNITED STATES PATENT OFFICE.

DOLOR BRABANT, OF LEWISTOWN, MONTANA.

SHIFTING THILL FOR VEHICLES.

SPECIFICATION forming part of Letters Patent No. 648,231, dated April 24, 1900.

Application filed September 1, 1899. Serial No. 729,205. (No model.)

*To all whom it may concern:*

Be it known that I, DOLOR BRABANT, a citizen of the United States, residing at Lewistown, in the county of Fergus and State of Montana, have invented a new and useful Shifting Thill for Vehicles, of which the following is a specification.

This invention relates to vehicles in general, and more particularly to the thills thereof; and it has for its object to provide a construction by which the thills can be so connected with the front axle that the draft-animal may travel in front of a wheel instead of intermediate the wheels and in the usual track.

In the drawings forming a part of this specification, and in which like numerals indicate like and corresponding parts in the several views, Figure 1 is a perspective view showing the invention as applied to the front axle of a vehicle. Fig. 2 is a bottom plan view of Fig. 1. Fig. 3 is a perspective view showing the parts of one member of the thill-coupling disassembled. Fig. 4 is a perspective view showing a portion of the singletree and the location of the evener thereon, the attachment of the singletree to the cross-bar of the shaft, and the location of the cross-bar, a portion of the cross-bar being shown in dotted lines. Fig. 5 is a perspective view showing the clip member of the thill-coupling.

Referring now to the drawings, 6 represents an axletree to which is secured an axle 7, having wheels 8 thereon, the axle extending at one end through and beyond a wheel, as shown at 9 and for a purpose which will be presently explained. The axle is held upon the axletree through the medium of clips 10, 11, and 12, each of which consists of a band bent around the axle and the tree and having its ends bent outwardly and lying in mutual contact, as shown in Fig. 5, and having a perforation 13 for the reception of a clamping-bolt. If desired, a plurality of perforations 13 may be formed for the reception of two or more bolts 14, as shown in Fig. 2. On the opposite or front faces of the clips are formed forwardly and parallel extending ears 15, the ears of the clip 11 being adapted to receive the perforated head 17 of an opposing thill-coupling member, a bolt 18 being passed through said ears and head to hold the latter in place. The head 17 is formed upon one element 19 of a thill-coupling member, and this element 19 consists of a plate adapted for slidable adjustment in a plate 20, having its sides bent rearwardly and inwardly to form a passage to receive the element 19. The plate 20 has an upwardly-curved portion 21, upon the upper surface of which is fixed a thill 22, the lower end of the thill having a rear projection 23, through which and into the plate 20 is passed a securing screw or bolt 24. (Shown in Fig. 1.) The element 19 has its end opposite to the head 17 bent downwardly, as shown at 25, to prevent withdrawal from the plate 20, and through the element 19 are formed a series of perforations 26, adapted to successively register with perforations 27 in the plate 20 to permit of the passage of a securing pin or bolt through the alining perforations to hold the element 19 in fixed relation to the plate. Thus by withdrawing the bolt or pin 28 the thill-coupling may be shifted. The opposite thill 30 is provided with a coupling element 31, comprising a plate 32, similar in all respects to the plate 20, and in which sleeve is disposed a slidable element 33, the same in construction as the element 19, and the perforated head 34 of which is adapted to be placed upon the extension 9 of the axle, displacement from this extension being prevented by a pin 35, passed through a perforation in the extension. The element 33 is somewhat longer than the corresponding element 19 to correspond to the increased distance between its thill and the point of connection of the head of the element.

From the above description it will be seen that the thill-couplings may be adjusted to vary the location of the thill with respect to the axle. It will also be noted that with the connection between the plate 20 and element 19, above described, the rearwardly-bent sides of the plate permit the employment of a single securing-bolt, these sides preventing pivotal movement of the parts, which would be the case if the said portions were omitted and only one bolt used. Furthermore, the bent end of the element 19 prevents the complete displacement of the element, and thus should the securing-bolt be displaced the thills would not be pulled from the vehicle.

Connected with the thills 22 and 30 is the usual cross-bar 40ª, and to the under side of this cross-bar is pivoted a lever 40 through the medium of a pin or bolt 41, and which lever lies parallel with the cross-bar and is passed through a band or keeper 42 upon the bar, beyond which it is turned at right angles, as shown at 43, and is perforated for the reception of one end of a rod 44, having an eye 45 in its opposite end, which is disposed upon the bolt 18 of the clip 11. Pivotally connected with the lever 40, intermediate the pin 41 and the keeper 42, and lying beneath the cross-bar 40ª is a singletree 46, adapted for attachment of the traces in the usual manner. An additional bar 47 is connected at its outer end with the pin 41, while the inner end thereof is bent to form a helix 48, which lies between the ears of the clip 12 and through which ears and helix is passed a securing-bolt 49. The clip 12, as shown, is placed adjacent the extended end of the axle, while the clip 11 is placed at a point about two-thirds of the way between the extended end of the axle and the opposite end, the clip 10 being arranged adjacent said opposite end of the axle. A third brace-bar 50 has a helix 51 at one end, which is disposed between the ears of the clip 10, and through which ears and helix is passed a bolt 52, the opposite end of the bar or rod 50 being extended outwardly to lie against the outer side of the thill 30 and has its end bent forwardly and passed through a staple 53 upon said thill, the end of the forwardly-extending portion having an eye through which is passed a bolt 54.

In practice the curves at the rear ends of the thills are higher than is usual in order that the singletree may have the usual elevation, and from the above description it will be seen that the draft upon the singletree will be distributed by the evener, which comprises the lever 40, and by the rods connected therewith, so that the applied energy will be at substantially the same points as in the usual arrangement. It will also be seen that an animal hitched between the shafts will travel out of the usual path and will thus have a smoother portion of the road and can make better progress.

It will of course be understood that in practice the specific construction and arrangement herein shown may be varied and that any desired proportions and materials may be used without departing from the spirit of the invention.

Having thus described the invention, what I claim is—

1. The combination with an axle having wheels thereon said axle having an extension beyond one of the wheels, of thills, one of which is connected with the axle between the wheels and the other of which is connected with the extension of the axle, a lever pivotally connected with the thills, a rod connecting the free end of the lever with the axle, and a singletree pivoted to the lever.

2. The combination with an axle and thills, of thill-couplings comprising plates fixed to the thills, each of said plates having its sides bent rearwardly and inwardly to lie parallel with the body portion of the plate and at the same side thereof to form a passage, and elements slidably disposed within the passages of the plates and adapted for connection with the axle, each of said elements having a downturned end to prevent its total displacement from its plate and being held against pivotal movement by the bent portion of the plate, and perforations in said plates and elements adapted to receive securing-bolts for holding the elements at different points within the plates.

3. The combination with an axle having wheels thereon and an extension beyond one of the wheels, of clips upon the axle and adjacent the wheels, a third clip intermediate the first-named clips, thills connected with the intermediate clip and the extension of the axle, a lever pivotally connected with the thills, a rod connecting the intermediate clip with the free end of the lever, a singletree pivoted to the lever, and additional rods connecting the first-named clips with the thills.

In testimony that I claim the foregoing as my own I have hereto affixed my signature in the presence of two witnesses.

DOLOR BRABANT.

Witnesses:
SIMEON S. HOBSON,
EDGAR G. WORDEN.